(12) United States Patent
Yamaoka et al.

(10) Patent No.: US 10,492,365 B2
(45) Date of Patent: *Dec. 3, 2019

(54) LAWNCARE APPARATUS

(71) Applicant: CHERVON (HK) LIMITED, Wanchai (HK)

(72) Inventors: Toshinari Yamaoka, Nanjing (CN); Fangjie Nie, Nanjing (CN); Haishen Xu, Nanjing (CN); Xiandian Shao, Nanjing (CN)

(73) Assignee: CHERVON (HK) LIMITED, Wanchai (HK)

( * ) Notice: Subject to any disclaimer, the term of this patent is extended or adjusted under 35 U.S.C. 154(b) by 413 days.

This patent is subject to a terminal disclaimer.

(21) Appl. No.: 15/373,798

(22) Filed: Dec. 9, 2016

(65) Prior Publication Data

US 2017/0086375 A1 Mar. 30, 2017

Related U.S. Application Data

(63) Continuation-in-part of application No. 14/048,158, filed on Oct. 8, 2013, now Pat. No. 9,888,627.

(30) Foreign Application Priority Data

Oct. 15, 2012 (CN) .......................... 2012 1 0387914
May 3, 2013 (CN) ...................... 2012 2 0602040 U

(51) Int. Cl.
*A01D 69/08* (2006.01)
*A01D 34/82* (2006.01)
*A01D 101/00* (2006.01)

(52) U.S. Cl.
CPC .......... *A01D 69/08* (2013.01); *A01D 34/824* (2013.01); *A01D 2101/00* (2013.01)

(58) Field of Classification Search
CPC .... A01D 69/08; A01D 34/824; A01D 34/828; A01D 69/00; A01D 2101/00
See application file for complete search history.

(56) References Cited

U.S. PATENT DOCUMENTS

D158,847 S 6/1950 Flanigan
2,727,753 A 12/1955 Johnson et al.
(Continued)

FOREIGN PATENT DOCUMENTS

CN 1299582 6/2001
CN 201146132 11/2008
(Continued)

OTHER PUBLICATIONS

United States Patent and Trademark Office, Office Action issued on U.S. Appl. No. 15/238,276, dated Feb. 26, 2019, 9 pages.
(Continued)

*Primary Examiner* — Robert E Pezzuto
*Assistant Examiner* — Joan D Misa
(74) *Attorney, Agent, or Firm* — Greenberg Traurig, LLP

(57) ABSTRACT

A lawncare apparatus includes a main body, multiple wheels supporting the main body, a cutting blade disposed in the main body, a motor driving the cutting blade, an operating arm connected to the first end of the main body, and a transmission assembly. The transmission assembly is configured to prevent the switching device from being controlled in a mechanical way by the operation assembly or/and turning on the motor when the first member is moved towards the main body to a predetermined position relative to the second member.

9 Claims, 21 Drawing Sheets

(56) References Cited

U.S. PATENT DOCUMENTS

| | | | | |
|---|---|---|---|---|
| 3,038,737 | A | 6/1962 | Lill | |
| 3,142,950 | A * | 8/1964 | West | A01D 34/74 16/437 |
| 3,357,716 | A | 12/1967 | Musichuk | |
| 3,423,103 | A | 1/1969 | Maltarp | |
| 3,462,924 | A | 8/1969 | Erickson et al. | |
| 3,485,017 | A * | 12/1969 | Beares | A01D 34/824 16/437 |
| 3,527,469 | A | 9/1970 | Gobin | |
| 3,534,432 | A | 10/1970 | Davies et al. | |
| 3,603,065 | A * | 9/1971 | Weber | A01D 34/475 56/10.5 |
| 3,659,170 | A | 4/1972 | Burkett | |
| 3,750,378 | A | 8/1973 | Thorud | |
| 3,816,873 | A * | 6/1974 | Thorud | A01D 34/824 16/437 |
| 3,855,763 | A * | 12/1974 | Seifert | A01D 34/63 16/437 |
| 3,942,604 | A | 3/1976 | Black, III | |
| 3,982,082 | A * | 9/1976 | Thorud | A01D 34/475 200/43.16 |
| 4,003,190 | A | 1/1977 | Braun et al. | |
| 4,043,102 | A | 8/1977 | Uhlinger et al. | |
| 4,044,532 | A * | 8/1977 | Lessig, III | A01D 34/6818 200/331 |
| 4,167,221 | A * | 9/1979 | Edmonson | A01D 34/6818 180/19.3 |
| 4,362,228 | A * | 12/1982 | Plamper | A01D 34/6812 477/170 |
| 4,363,206 | A * | 12/1982 | Schmitt | A01D 34/6812 192/99 S |
| 4,394,893 | A | 7/1983 | Konich et al. | |
| 4,413,466 | A * | 11/1983 | Beugelsdyk | A01D 34/475 180/19.3 |
| 4,428,180 | A * | 1/1984 | Carlson | A01D 34/6806 56/10.5 |
| 4,432,191 | A * | 2/1984 | Schmitt | A01D 34/6812 192/99 S |
| 4,503,958 | A * | 3/1985 | Nishio | A01D 34/6806 192/12 R |
| 4,833,935 | A | 5/1989 | Roelle | |
| 4,850,182 | A * | 7/1989 | Barnard | A01D 34/6806 56/10.8 |
| 4,870,811 | A | 10/1989 | Steele | |
| 4,936,160 | A * | 6/1990 | Barnard | A01D 34/6806 74/489 |
| 4,981,011 | A | 1/1991 | Olejak | |
| 5,138,824 | A | 8/1992 | Oshima et al. | |
| 5,163,275 | A | 11/1992 | Hare et al. | |
| 5,203,147 | A * | 4/1993 | Long | A01D 34/6818 56/10.1 |
| 5,209,051 | A | 5/1993 | Langdon | |
| 5,261,215 | A * | 11/1993 | Hartz | A01D 34/81 16/437 |
| 5,606,851 | A * | 3/1997 | Bruener | A01D 34/6806 56/10.8 |
| 5,636,504 | A | 6/1997 | Kaley et al. | |
| 5,784,868 | A * | 7/1998 | Wadzinski | A01D 34/6806 56/10.8 |
| 5,806,374 | A * | 9/1998 | Mizutani | A01D 34/6806 56/10.5 |
| 6,078,015 | A * | 6/2000 | Martinez | A01D 34/6818 200/332.2 |
| 6,082,083 | A * | 7/2000 | Stalpes | A01D 34/6806 56/10.8 |
| 6,095,294 | A * | 8/2000 | McGourthy, Sr. | B60T 7/14 188/166 |
| 6,220,005 | B1 * | 4/2001 | Plamper | A01D 34/6818 180/19.3 |
| 6,404,078 | B1 | 6/2002 | Thomas et al. | |
| 6,644,002 | B2 | 11/2003 | Trefz | |
| 6,658,829 | B2 * | 12/2003 | Kobayashi | A01D 34/6806 56/10.5 |
| 6,708,473 | B2 | 3/2004 | Nicolay et al. | |
| 6,737,598 | B1 | 5/2004 | Allen et al. | |
| 6,751,936 | B2 * | 6/2004 | Kucera | A01D 34/6818 56/10.5 |
| 6,796,392 | B2 * | 9/2004 | Kobayashi | B62D 51/04 180/19.3 |
| 7,178,322 | B2 | 2/2007 | Osborne | |
| 7,263,818 | B2 | 9/2007 | Osborne | |
| 7,293,397 | B2 * | 11/2007 | Osborne | A01D 34/824 56/10.8 |
| 7,543,430 | B2 * | 6/2009 | Kaskawitz | A01D 34/6812 56/11.3 |
| 7,591,126 | B2 | 9/2009 | Cox | |
| 7,707,812 | B2 | 5/2010 | Cheung | |
| 7,712,292 | B2 * | 5/2010 | Stover | A01D 34/824 180/19.3 |
| 7,762,049 | B2 * | 7/2010 | Eaton | A01D 34/6818 180/19.3 |
| 8,316,510 | B2 | 11/2012 | Anraku | |
| 8,359,821 | B2 | 1/2013 | Park | |
| 8,713,761 | B2 | 5/2014 | Grewe et al. | |
| 8,925,293 | B2 * | 1/2015 | Mikula | A01D 34/824 56/16.7 |
| 9,060,463 | B2 * | 6/2015 | Yamaoka | A01D 34/828 |
| 9,218,924 | B2 * | 12/2015 | Coussins | H01H 27/06 |
| 9,462,747 | B2 * | 10/2016 | Schmalz | A01D 34/82 |
| 9,491,907 | B2 * | 11/2016 | Edholm | A01D 34/824 |
| 9,596,806 | B2 * | 3/2017 | Yamaoka | A01D 69/02 |
| 9,651,138 | B2 * | 5/2017 | Helin | A01D 34/6806 |
| 9,826,686 | B2 * | 11/2017 | Yamaoka | A01D 69/02 |
| 9,847,186 | B2 * | 12/2017 | Wadzinski | H01H 13/14 |
| 9,986,686 | B2 * | 6/2018 | Yamaoka | A01D 69/02 |
| 10,070,588 | B2 * | 9/2018 | Yamaoka | A01D 69/02 |
| 10,123,478 | B2 * | 11/2018 | Shaffer | A01D 34/6806 |
| 2006/0075732 | A1 | 4/2006 | Nottingham et al. | |
| 2009/0217636 | A1 | 9/2009 | Loxterkamp et al. | |
| 2010/0162674 | A1 | 7/2010 | Eaton et al. | |
| 2011/0088362 | A1 | 4/2011 | Rosa et al. | |
| 2011/0126502 | A1 | 6/2011 | Pitman et al. | |
| 2012/0317821 | A1 | 12/2012 | Tsuchiya et al. | |
| 2013/0111866 | A1 | 5/2013 | Schmalz | |
| 2013/0212996 | A1 | 8/2013 | Shao et al. | |
| 2014/0102063 | A1 | 4/2014 | Yamaoka et al. | |
| 2014/0190141 | A1 * | 7/2014 | Edholm | A01D 34/824 56/10.5 |
| 2014/0196425 | A1 | 7/2014 | Lewis | |
| 2014/0331809 | A1 | 11/2014 | Mikula et al. | |
| 2018/0228089 | A1 * | 8/2018 | Yamaoka | A01D 69/02 |

FOREIGN PATENT DOCUMENTS

| | | |
|---|---|---|
| CN | 101516178 A | 8/2009 |
| CN | 201345826 Y | 11/2009 |
| CN | 101897261 | 12/2010 |
| CN | 201821663 | 5/2011 |
| CN | 102683052 | 9/2012 |
| CN | 102845186 | 1/2013 |
| CN | 202873363 | 4/2013 |
| EP | 0903074 A1 | 3/1999 |
| EP | 1543711 A2 | 6/2005 |
| EP | 3381259 | 10/2018 |
| JP | 2009268437 A | 11/2009 |
| WO | 2008026550 A1 | 3/2008 |

OTHER PUBLICATIONS

United States Patent and Trademark Office, Office Action issued on U.S. Appl. No. 14/048,158, dated May 1, 2017, 17 pages.

United States Patent and Trademark Office, Non-Final Office Action issued on U.S. Appl. No. 15/910,282, dated Jul. 30, 2019, 6 pgs.

United States Patent and Trademark Office, Non-Final Office Action issued on U.S. Appl. No. 16/406,337, dated Jul. 30, 2019, 8 pgs.

United States Patent and Trademark Office, Final Office Action issued on U.S. Appl. No. 15/238,276, dated Aug. 2, 2019, 7 pgs.

U.S.P.T.O., Final Office Action issued on U.S. Appl. No. 15/250,476, dated Mar. 1, 2018, 11 pgs.

(56) References Cited

OTHER PUBLICATIONS

U.S.P.T.O., Non-Final Office Action issued on U.S. Appl. No. 15/250,476, dated Oct. 13, 2017, 17 pgs.
U.S.P.T.O., Non-Final Office Action issued on U.S. Appl. No. 15/250,516, dated Oct. 13, 2017, 16 pgs.
United States Patent and Trademark Office, Non-Final Office Action issued on U.S. Appl. No. 15/373,840, dated Apr. 19, 2019, 14 pgs.
Canadian Intellectual Property Office, Office Action and Examination Search Report issued on CA Appl. No. 2,829,898, dated Jan. 27, 2015, 4 pgs.

* cited by examiner

LAWNCARE APPARATUS

RELATED APPLICATION INFORMATION

This application claims the benefit of and is a continuation-in-part of U.S. application Ser. No. 14/048,158, filed Oct. 8, 2013, which application claims the benefit of CN 201220602040.X, filed on May 3, 2013, and CN 201210387914.9, filed on Oct. 15, 2012, the disclosures of which are incorporated herein by reference in their entirety.

FIELD OF THE DISCLOSURE

The subject disclosure relates to garden tools and, more particularly, to a lawncare apparatus.

BACKGROUND

A commonly used lawncare apparatus, such as a walk-behind lawnmower, includes a cutting device, a deck supporting the cutting device, a chassis having four wheels to which the deck is mounted, and a handle for pushing a main body of the lawncare apparatus disposed at one end of the chassis.

When using the lawncare apparatus, there are two ways to transport the lawncare apparatus from a storage room to a lawn. The first way is to place the four wheels on the ground and push/pull the lawncare apparatus. The second way is to lift the lawncare apparatus away from the ground. The first way requires a large storage room and the second way requires that the lawncare apparatus is of light weight. Thus, the way to transport the lawncare apparatus from the storage room to the lawn needs to be improved.

SUMMARY

Generally, and without limitation, a lawncare apparatus is hereinafter described with includes a main body, multiple wheels supporting the main body, a cutting blade disposed in the main body, a motor driving the cutting blade, an operating arm connected to the first end of the main body, and a transmission assembly. The transmission assembly is configured to prevent the switching device from being controlled in a mechanical way by the operation assembly or/and turning on the motor when the first member is moved towards the main body to a predetermined position relative to the second member.

DETAILED DESCRIPTION

Figure 1:
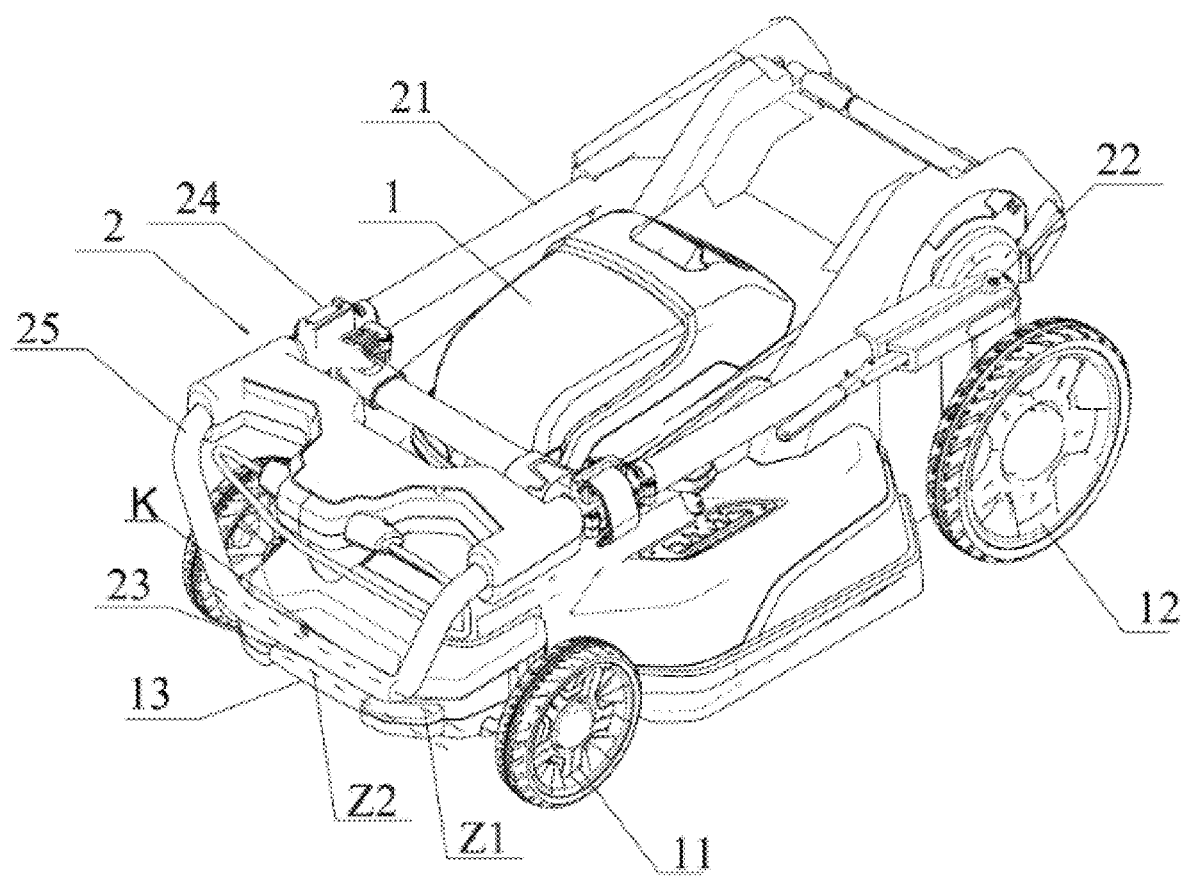
FIG. 1 is a schematic, isometric view showing an exemplary lawncare apparatus constructed according to the description which follows wherein an operating arm is folded.
Figure 2:
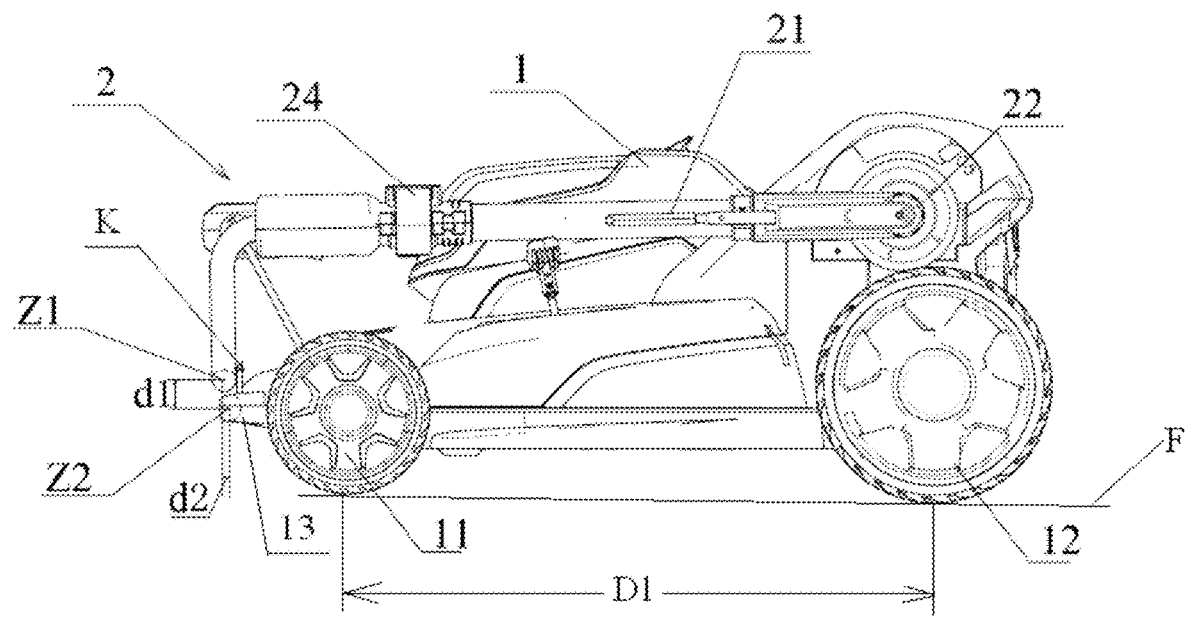
FIG. 2 is a side schematic view showing the exemplary lawncare apparatus of FIG. 1.

Referring to FIG. 1 and FIG. 2, in the illustrated embodiment, the lawncare apparatus is a hand push lawncare apparatus. The lawncare apparatus includes a main body 1, a first pair of wheels 11 and a second pair of wheels 12 supporting the main body 1, a cutting blade disposed in the main body 1, a motor for driving the cutting blade, and an operating arm 2 connected to the first end (rear end) of the main body 1. The first pair of wheels 11 and the second pair of wheels 12 are disposed respectively at the second end (front end) and the first end (rear end) of the main body 1, the operating arm 2 is pivotally connected to the rear end of the main body 1 by a pivot shaft 22 and positioned above the second pair of wheels 12. The front end of the main body 1, which is away from the operating arm 2, includes an elongated handle 13, in the illustrated embodiment, the elongated handle 13 is substantially cylinder-shaped and includes an axis Z2 along the longitude direction. The operating arm 2 includes a cylindrical gripping portion 23 and can be folded to a folded position, and the cylindrical gripping portion 23 includes an axial central line Z1.

When the operating arm is at the folded position and the first pair of wheels 11 and the second pair of wheels 12 both contact the horizontal surface F, if the gripping portion 23 is above the handle 13, the distance d1 in the vertical direction between the axial central line Z1 and the axis Z2 along the longitude direction is greater than the sum of the radius of the gripping portion 23 and the radius of the cylinder-shaped handle 13, and the distance d1 is less than 5 cm. For example, the diameters of the gripping portion 23 and the cylinder-shaped handle 13 are both 1.5 cm and the distance d1 is at least greater than 1.5 cm. Preferably, the distance d1 is 3 cm, and a distance d2 in horizontal direction between the axial central line Z1 and the axis Z2 is also less than 5 cm, and in the illustrated embodiment, the distance d2 is preferably 0.5 cm. Therefore, when the operating arm 2 is at the folded position, the user can grip both the gripping portion 23 and the cylinder-shaped handle 13 conveniently.

Additionally, in an alternative embodiment, to allow the user to grip both the gripping portion 23 and the cylinder-shaped handle 13 more conveniently, the internal profile of the gripping portion 23 is mated with the external profile of the cylinder-shaped handle 13, such that when the operation arm 2 is at the folded position, the outer surface of the gripping portion 23 and the cylinder-shaped handle 13 contact with each other, that is, at this time the gripping portion 23 and the cylinder-shaped handle 13 can lie in a horizontal plane, the distance d2 in horizontal direction between the axial central line Z1 and the axis Z2 is larger than the sum of the radius of the gripping portion 23 and the radius of the cylinder-shaped handle 13, and the distance d1 is zero. It should be noted that the external profile of the gripping portion 23 may be designed to mate with the internal profile of the cylinder-shaped handle 13.

To allow the user to grip both the gripping portion 23 and the cylinder-shaped handle 13 more stably, a clip K is disposed on the handle 13, and when the operation arm is at the folded position, the clip K is engaged with the cylindrical gripping portion 23.

Further, in the illustrated embodiment, the operating arm 2 is extendable, and a safe switch assembly 240 is disposed in the operating arm 2, the operating arm 2 includes an inner pipe 25 and an outer pipe 21, the outer pipe 21 is rotatably connected to the rear end of the main body 1 by the pivot shaft 22, and the end of the outer pipe 21 includes a pipe sleeve 24.

Figure 3:
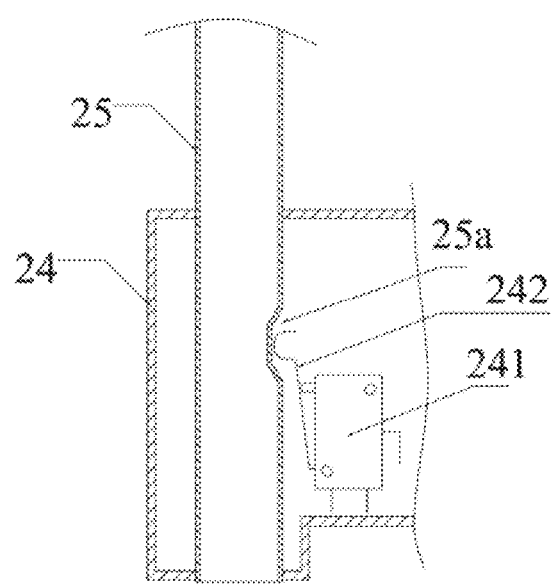
FIG. 3 is a schematic view showing an exemplary safety switch assembly of the lawncare apparatus of FIG. 1.

Referring to FIG. 3, the safe switch assembly 240 is disposed in the sleeve pipe 2 and a safety shift structure 25a is disposed in the inner pipe 25. The safe switch assembly 240 includes a safety switch 241 and a trigger assembly 242 configured to trigger the safety switch 241 when the safety shift structure 25a of the inner pipe 25 is disengaged from a safety location and reset the safety switch 241 when the safety shift structure 25a returns to the safety location, and the safety switch 241 is electrically connected to a control circuit for controlling the motor in the main body 1.

In the embodiment, the trigger assembly 242 is a contacting spring sheet, one end of the contacting spring sheet is connected to the safety switch 241, and the other end is a free end. When the inner pipe 25 slides, the wall of the inner pipe 25 presses the contacting spring sheet to trigger the safety switch 241, the contacting spring sheet 242 is provided with elasticity; when the inner pipe 25 slides, the safety shift structure 25a is back to the safe position, at this time the safety shift structure 25a can be a receiving groove configured to accommodate the contacting spring sheet, and the contacting spring sheet 242 is out of outer force and will not trigger the safety switch 241.

When the inner pipe 25 is retracted into the outer pipe 21, the safety shift structure 25a leaves the safe position, the wall of the inner pipe 25 presses the contacting spring sheet 242 to trigger the safety switch, at this time, even during the transporting process the user operates the operating switch by mistake, the motor cannot be started, which can reduce the possibility of danger happening to the user.

Figure 4:
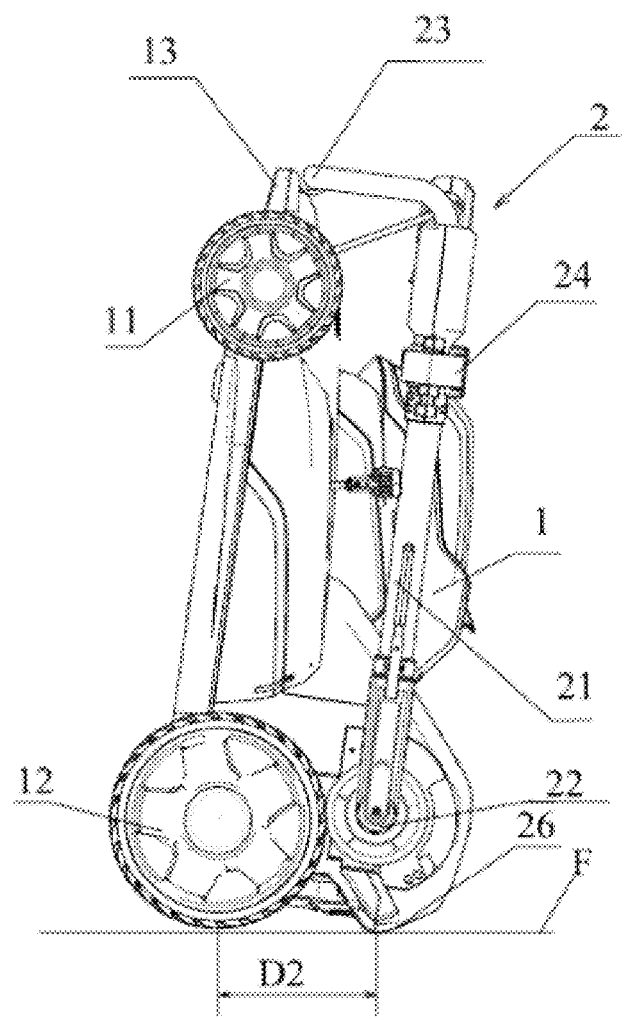
FIG. 4 is a side schematic view showing the lawncare apparatus of FIG. 1 in a storage position.
Figure 5:
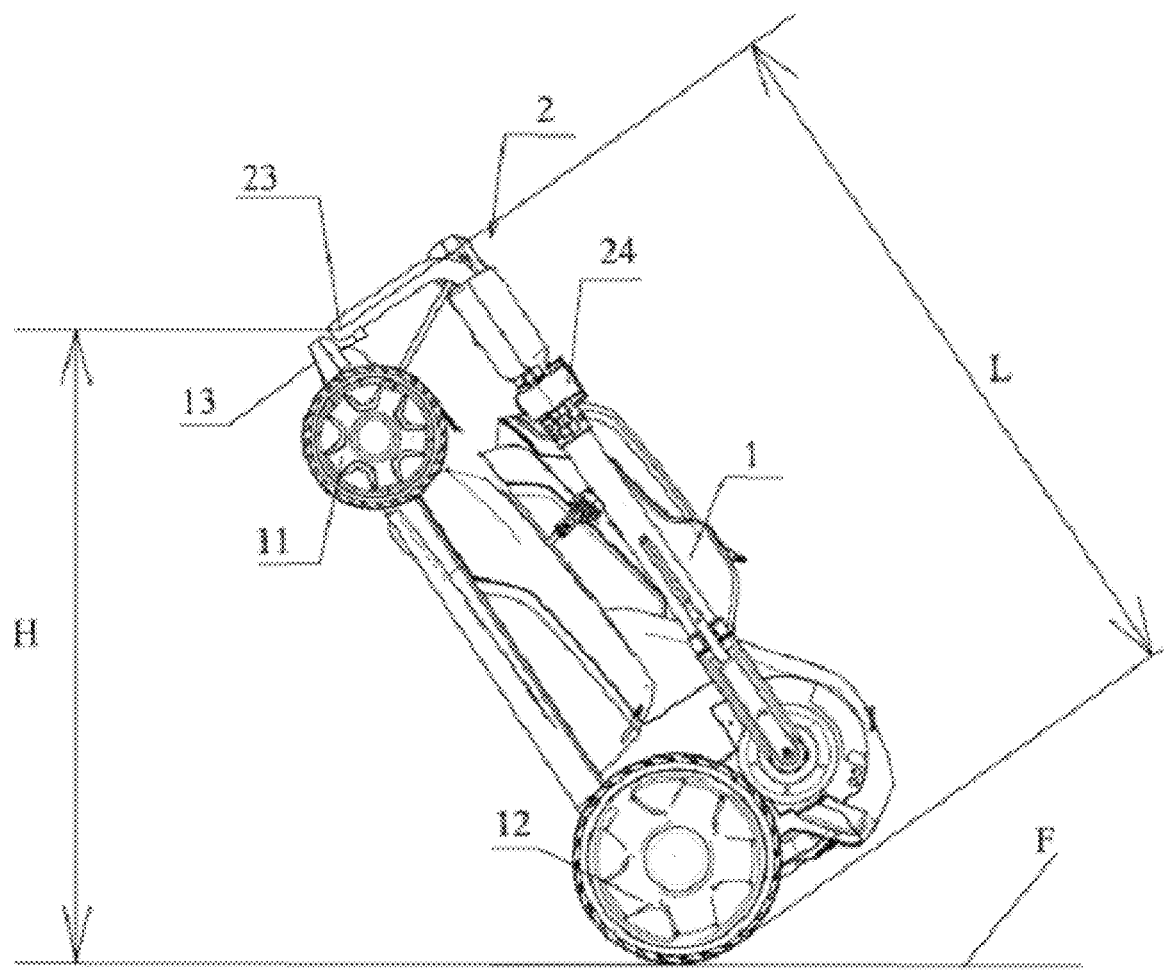
FIG. 5 is a side schematic view showing the lawncare apparatus of FIG. 1 in an obliquely disposed, pulling position.

Additionally, referring to FIG. 2 again, when the lawncare apparatus is at the using position, the first pair wheels 11 and the second pair wheels 12 are supported on the supporting surface F, if light is shining from a direction perpendicular to the supporting surface F, the main body 1 of the lawncare apparatus projects a first orthographic projection on the supporting surface F. Referring to FIG. 4, the lawncare apparatus is at the storage position. When the lawncare apparatus is stored, the lawncare apparatus stands upright for storing in a storage room, the operating arm 2 is folded, and only the second wheels 2 are supported on the supporting surface F. For improving stability, a supporting portion 26 is disposed on the main body 1 for supporting the device on the supporting surface F, and the supporting portion can be integrated with or separated from the main body 1. In the same way, at this time if light is shining from a direction perpendicular to the supporting surface F, the main body 1 of the lawncare apparatus projects a second orthographic projection on the supporting surface F. Since a width of the lawncare apparatus at the using position is the same as that of the lawncare apparatus at the storage position, and the distance D1 between the first pair wheels 11 and the second pair wheels 12 is larger than the distance D2 between the first pair of wheels 11 and the supporting portion 26, the first orthographic projection area of the lawncare apparatus at the using position is larger than the second orthographic projection area of the lawncare apparatus at the storage position. Referring to FIG. 5, when the lawncare apparatus is to be changed from the using position to the obliquely pulled position, only the second pair wheels 12 contact the supporting surface while the hands of the user grip a pull portion which is preferably the cylindrical gripping portion 23. At this time, the operating arm 2 is at the folded position, the distance of the gripping portion 23 relative to the supporting surface F is H; the distance of the gripping portion 23 relative to the point the second pairs wheels 12 contacting the supporting surface F is L, and the ratio of H to L may be 0.5~1, preferably 0.8~0.9, for meeting the needs of ergonomics. Therefore, when pulling the lawncare apparatus (e.g., to move the apparatus to a location in which it will be setup for use), only part of the weight of the lawncare apparatus is supported by the user, which makes the user feel more labor-saving.

From the above, the lawncare apparatus can be pulled obliquely and, because of the structural mating mate relation between the operating arm and the cylindrical gripping portion, the user can feel more comfortable during transporting and the pulling process is more stable, so that the volume of the lawncare apparatus during transporting is reduced and the operability of lawncare apparatus pulling is improved. Since a safety switch mechanism is disposed on the operating arm, misoperation of the lawncare apparatus can be avoided and safety of pulling is improved.

As shown in FIGS. 6-10, in an alternative embodiment, a lawncare apparatus 100 includes a main body 110 and a handle 120. The handle 120 is rotatably connected to the main body 110 around a first rotation axis 120a.

The lawncare apparatus 100 further includes a plurality of wheels 131-133 rotatably connected to the main body 110 to support the main body 110 and a motor 140 which is supported by the main body 110.

The motor 140 is used to drive a mower blade 141 to rotate, and the main body 110 is configured to support and accommodate the motor 110. The motor 140 may be an electrical motor. For providing power to the motor 140, the main body 110 can detachably connect a battery pack 150 to supply electrical energy to the motor 140 and other electronic device of the lawncare apparatus 100.

The main body 110 forms a battery pack cavity 111 for receiving the battery pack 150. The battery pack cavity 111 has an open end 111a to let the battery pack 150 enter to the battery pack cavity 111, and the main body 110 includes a cover 112 for covering the open end 111a of the battery pack cavity 111 so as to protect the battery pack 150. The cover 112 is capable of rotating relative to the battery pack cavity 111 around a second rotation axis 112a such that when the cover 112 rotates to a first position, the cover 112 closes the battery pack cavity 111. When the cover 112 rotates to a first position, the battery pack cavity 111 is open to the outside space. The second rotation axis 112a of the cover 112 is parallel to the first rotation axis 120a of the handle 120.

The motor 140 is positioned between the battery pack cavity 111 and the rotation axis 120a of the handle 120.

The battery pack 150 is a rechargeable battery pack, and the battery pack 150 has an output voltage which is greater than 30V, for example, the battery pack 150 has an output voltage of 56V.

It should be noted that the main body 110 is capable of receiving more battery packs to improve the power supply of the lawncare apparatus 100.

The lawncare apparatus 100 further includes a switching device 160, the switching device 160 is provided to turn on or turn off the motor 140.

As shown in FIGS. 6-9, the lawncare apparatus 100 further includes a first operation member 180 which is movably connected to the handle 120. The first operation member 180 is rotatably connected to the handle 120 about a third rotation axis 180a, the third rotation axis 180a is parallel to the first rotation axis 120a. It should be noted that the first operation member 180 may also be slidably connected to the handle 120.

The handle 120 is provided for users to operate the lawncare apparatus 100 and push the lawncare apparatus 100 moving forward by the handle 120.

Figure 7:
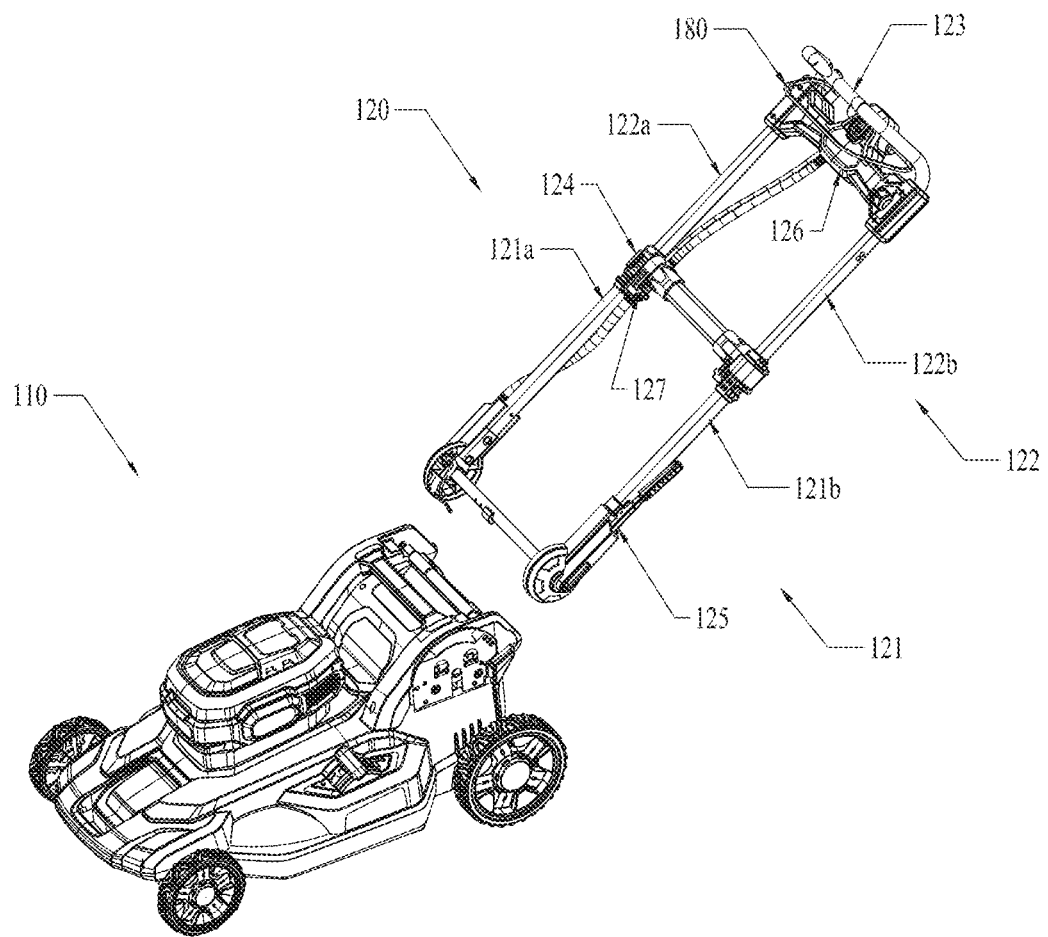
FIG. 7 is a schematic view showing the lawncare apparatus in FIG. 6 when a main body and a handle are in a separation state.
Figure 8:
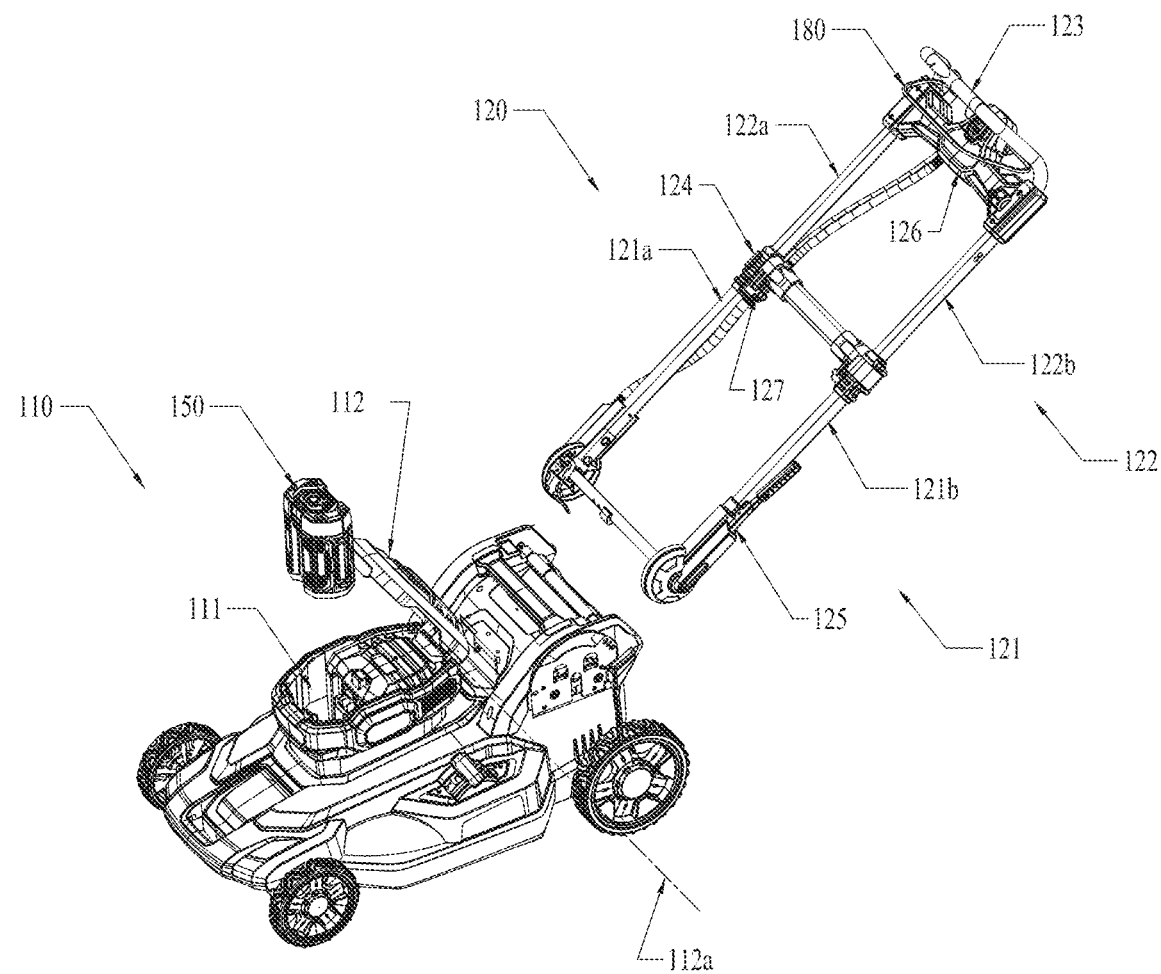
FIG. 8 is a schematic view showing the lawncare apparatus in FIG. 6 when the battery pack is separated from the main body.
Figure 9:
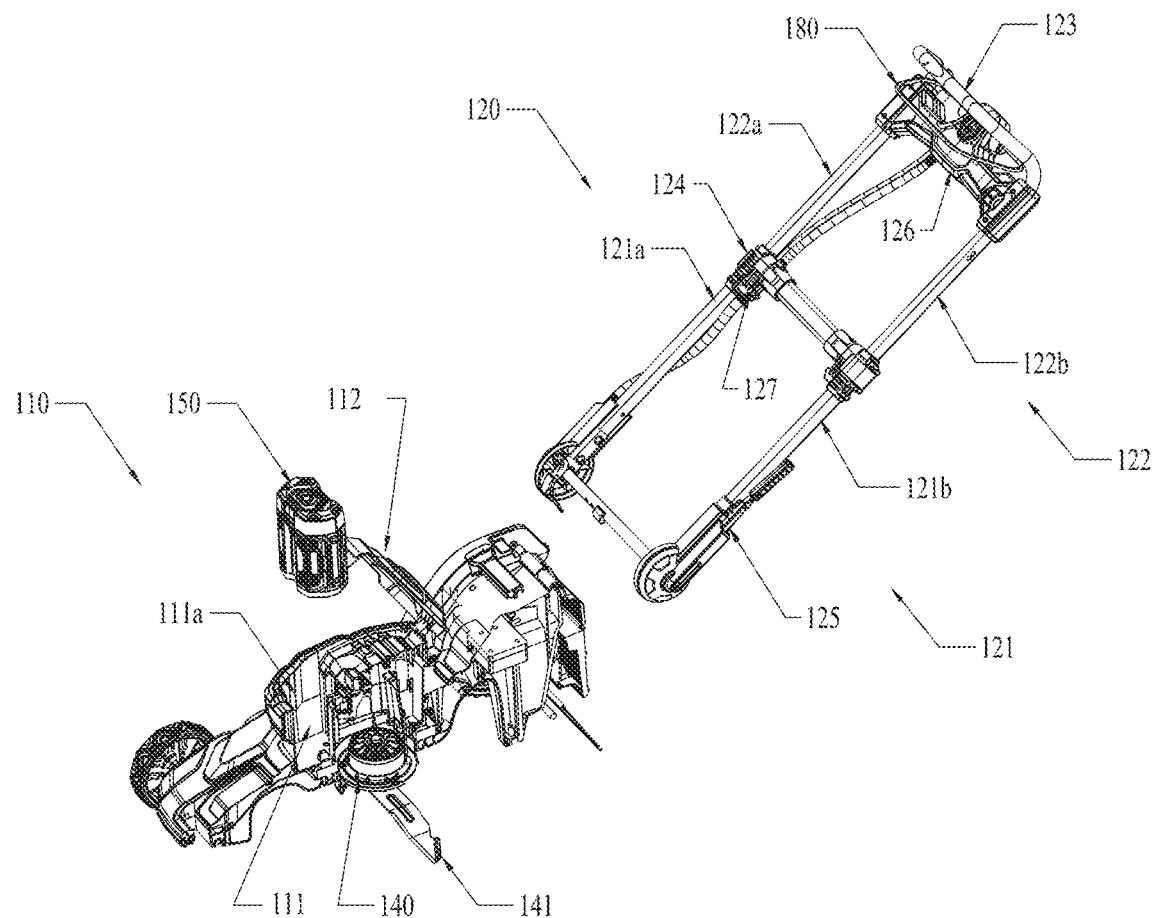
FIG. 9 is a schematic view showing an internal structure of the main body of the lawncare apparatus in FIG. 6.
Figure 10:
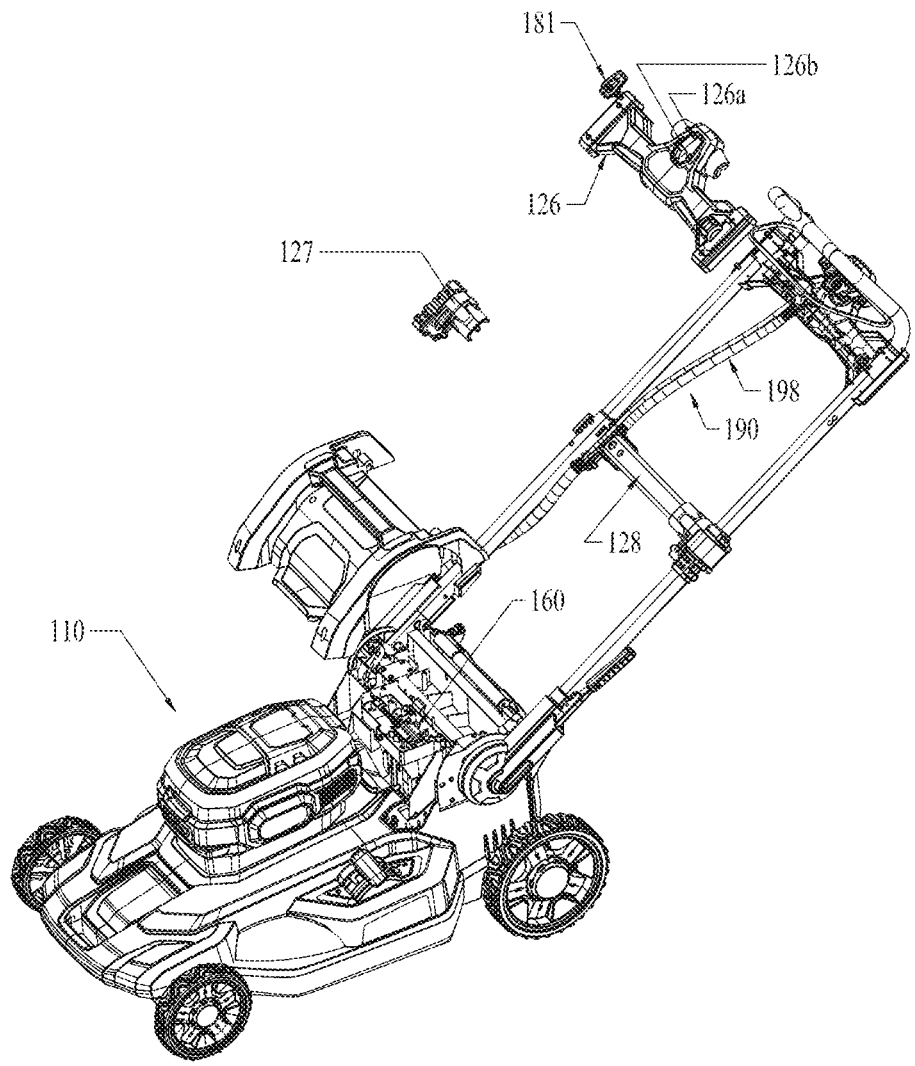
FIG. 10 is an exploded, schematic view showing the lawncare apparatus in FIG. 6.
Figure 11:
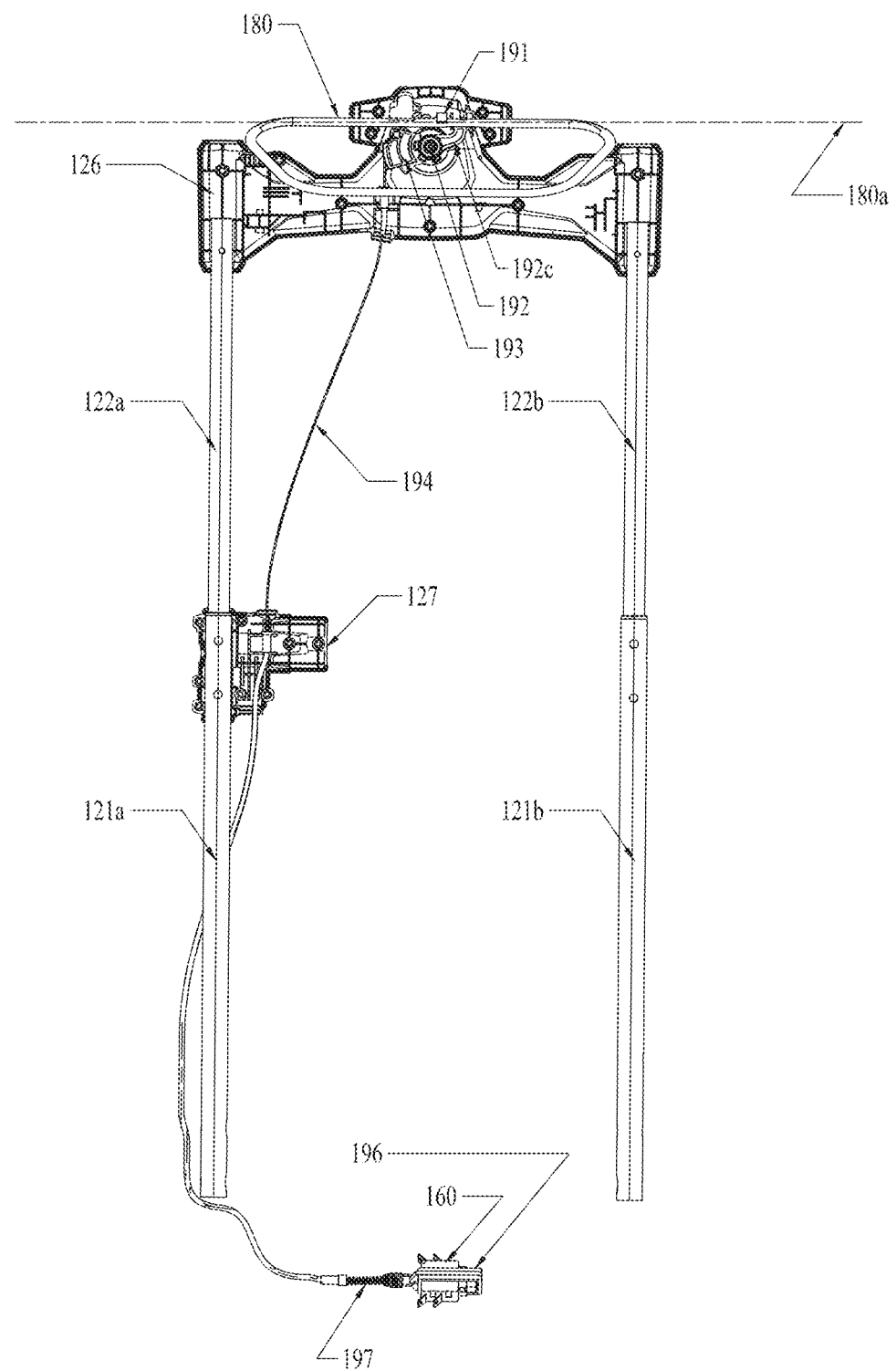
FIG. 11 is a schematic view showing the handle and a transmission assembly of the lawncare apparatus in FIG. 6.
Figure 12:
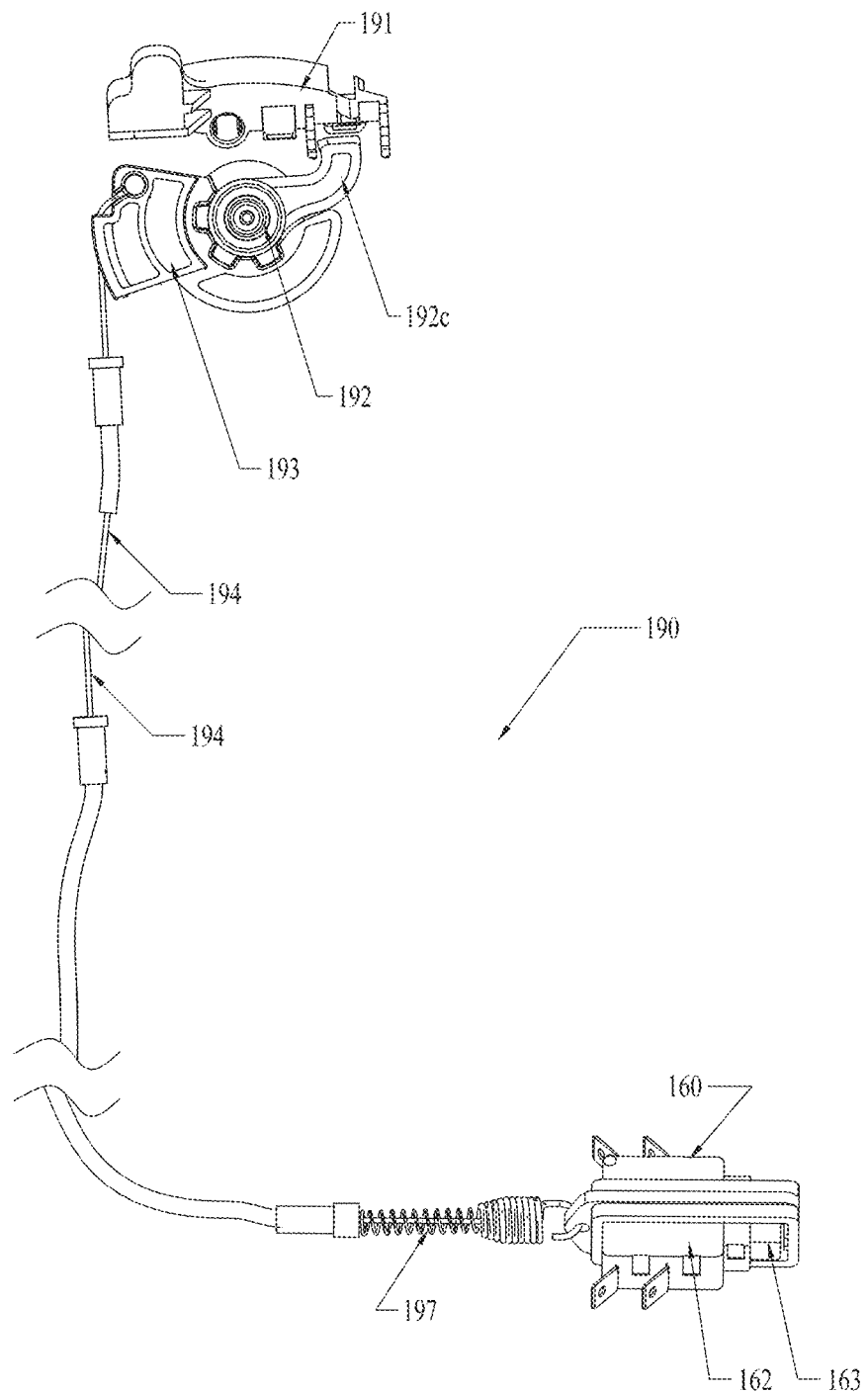
FIG. 12 a schematic view showing the transmission assembly of the lawncare apparatus in FIG. 6 when a trigger member is not pulled to trigger a switching device.
Figure 13:
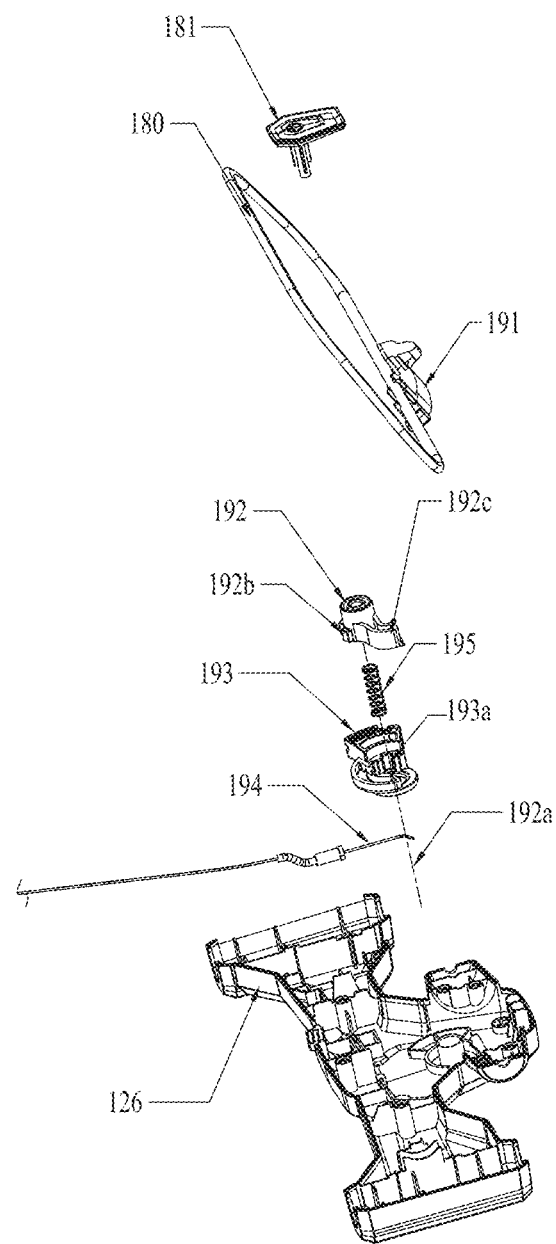
FIG. 13 a partially exploded view of the lawncare apparatus in FIG. 6.

As shown in FIGS. 7-9, the handle 120 includes a rotation arm assembly 121, a slide arm assembly 122 and a gripping portion 123.

The rotation arm assembly 121 is rotatably connected to the main body 110 around the first rotation axis 120a such that users can fold the handle 120 on the main body 110.

The slide arm assembly 122 is slidably connected to the rotation arm assembly 121 such that users can move the slide arm assembly 122 towards the main body 110 to reduce the distance between the gripping portion 123 and the first rotation axis 120a.

The users can operate the rotation arm assembly 121 and the slide arm assembly 122 to cause the lawncare apparatus 100 to enter into a storing state, so that the volume of the lawncare apparatus 100 is reduced when users need to store the lawncare apparatus 100 in a limited space.

Figure 6:
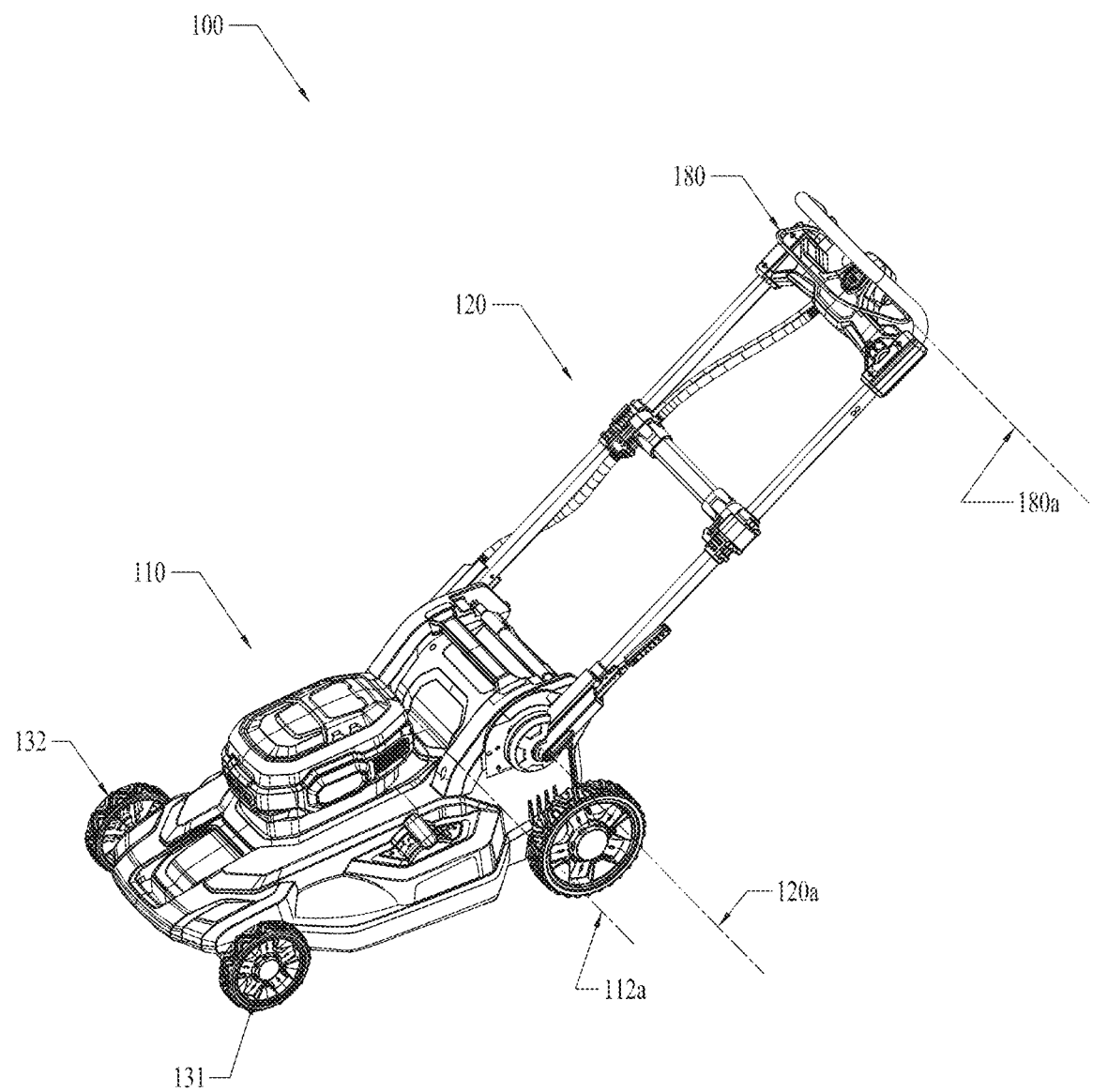
FIG. 6 is a schematic view showing an exemplary lawncare apparatus.

The handle 120 further includes a first locking assembly 124 and a second locking assembly 125. The first locking assembly 124 is configured to lock the rotation position of the rotation arm assembly 121 relative to the main body 110 and the second locking assembly 125 is configured to lock the slide position of slide arm assembly 122 relative to the rotation arm assembly 121. When a user wants to use the lawncare apparatus 100 which is in the storing state, the user should adjust the rotation position of the rotation arm assembly 121 relative to the main body 110 and slide position of slide arm assembly 122 relative to the rotation arm assembly 121 so as to cause the handle to move to a predetermined security operating state as shown in FIG. 6, and then the user should operate the first locking assembly 124 and the second locking assembly 125 to lock the handle 120 at the predetermined security operating state to keep the user far enough away from the main body 110 when the user stands behind the main body 110 and grips the gripping portion 123 to push the lawncare apparatus 100. The handle 120 has different predetermined security operating states for different height users.

As shown in FIGS. 10-15, the lawncare apparatus 100 further includes a transmission assembly 190, and the transmission assembly 190 is capable of performing a mechanical transmission between the first operation member 180 and the switching device 160. In particular, when the first operation member 180 is moved by a user, the movement of the first operation member 180 will transmit to the switching device 160 so as to change the state of the switching device 160. Thus, users can operate the first operation member 180 to change the state of the switching device 160 when the mechanical transmission between the first operation member 180 and the switching device 160 is available. In this manner, the transmission assembly 190 is capable of cutting the mechanical transmission between the first operation member 180 and the switching device 160 when the handle is not at a predetermined security operating state. If one of the rotation position of the rotation arm assembly 121 relative to the main body 110 and slide position of slide arm assembly 122 relative to the rotation arm assembly 121 is not at a predetermined state, the handle 120 is not at predetermined security operating state.

For example, the transmission assembly 190 can cut off the mechanical transmission between the first operation member 180 and the switching device 160 when the slide position of slide arm assembly 122 is moved towards the main body 110 to a predetermined slide position relative to the rotation arm assembly 121.

It should be noted that the transmission assembly 190 should cut off when the rotation arm assembly 121 is moved towards the main body 110 to a predetermined rotation position relative to the main body 110.

When the mechanical transmission between the first operation member 180 and the switching device 160 is cut off, the user cannot change the state of the switching device 160 by operating the first operation member 180.

The switching device 160 is configured to be at a state that the switching device 160 causes the motor 140 to turn off if the switching device 160 is not subjected to an external force. Therefore, the transmission assembly 190 can keep the switching device turning off the motor in a mechanical way when the slide position of slide arm assembly 122 is moved towards the main body 110 to a predetermined slide position relative to the rotation arm assembly 121.

The handle 120 further includes a first handle housing 126 which is fixedly connected to the slide arm assembly 122 and a second handle housing 127 which is connected to the rotation arm assembly 121.

The slide arm assembly 122 includes two slide arms 122a, 122b which are parallel to each other. The rotation arm assembly 121 includes two rotation arms 121a, 121b which are parallel to each other. The rotation arm 121a is structured as a tube which is capable of receive the slide arm 122a slidably; the rotation arm 121b is also structured to be a tube which is capable of receive the slide arm 122b slidably.

The handle 120 further includes a girder 128 between the two slide arms 122a, 122b, the girder 128 is connected to the second handle housing 127. The second handle housing 127 may also be structured as a girder which is connected to the two slide arms 122a, 122b.

The first handle housing 126 is fixedly connected to slide arms 122a, 122b, and the gripping portion 123 is fixedly connected to the first handle housing 126.

The transmission assembly 190 includes a trigger block 191, a clutch member 192, a transmission member 193, and a flexible member 194.

The trigger block 191 is fixedly connected to the first operation member 180 and is capable of moving with the first operation member 180.

The clutch member 192 is movably connected to the first handle housing 126, the clutch member 192 is capable of rotating relative to the first handle housing 126 around a forth rotation axis 192a and sliding relative to the first handle housing 126 along a direction which is parallel to the forth rotation axis 192a. The forth rotation axis 192a is substantially perpendicular to the third rotation axis 180a of the first operation member 180. The clutch member 192 has an engaging position and a disengaging position at its sliding direction.

The transmission member 193 is capable of rotating to the first handle housing 126 around the forth rotation axis 192a, but the transmission member 193 is positioned at a fixed position at the direction of forth rotation axis 192a.

The clutch member 192 forms a first engaging portion 192b, the transmission member 193 forms a second engaging portion 193a which is configured to engage with the first engaging portion 192b when the clutch member 192 is positioned at the engaging position; the transmission member 193 and clutch member 192 can rotate synchronously when the first engaging portion 192b engages with second engaging portion 193a.

The clutch member 192 also forms a lever portion 192c for being contacted by the trigger block 191 when the clutch member 192 is positioned at the engaging position.

Figure 15:
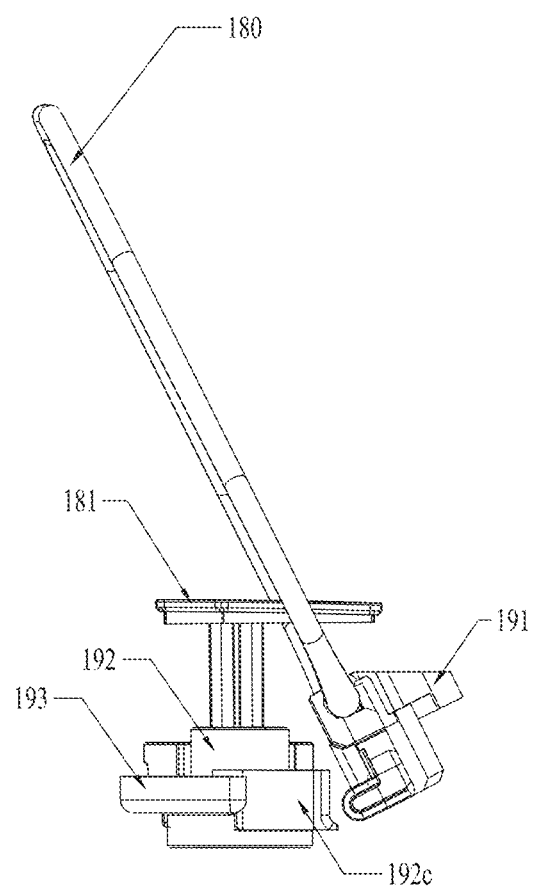
FIG. 15 shows a state of the transmission assembly when the second operation member is operated to a preset state.

As shown in FIG. 15, when the clutch member 192 is positioned at the engaging position, if a user rotates the first operation member 180, the trigger block 191 will contact the lever portion 192c such that the clutch member 192 and transmission member 193 are driven to rotate synchronously.

Figure 14:
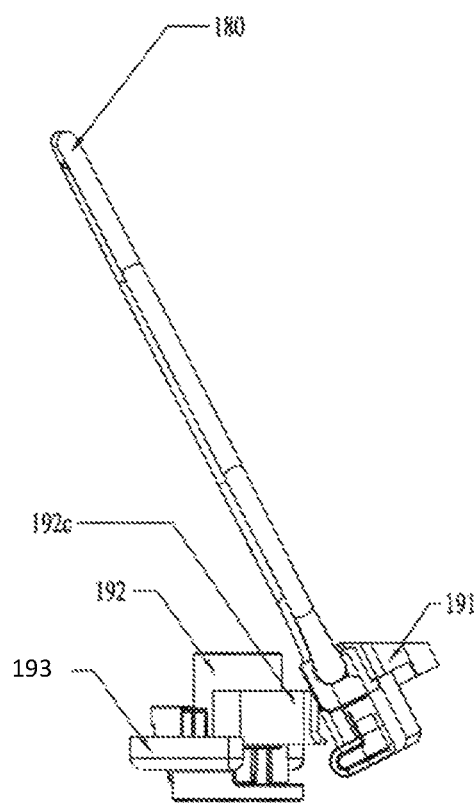
FIG. 14 shows a state of the transmission assembly without the second operation member.

As shown in FIG. 14, when the clutch member 192 is positioned at the disengaging position, the trigger block 191 cannot contact the lever portion 192c such that transmission member 193 cannot be driven to rotate by a user.

The transmission assembly 190 further includes a first biasing member 195 which is configured to bias the clutch member 192 to the disengaging position.

The lawncare apparatus 100 further includes a second operation member 181, the second operation member 181 is configured to be operated by the user before using the first operation member 180; and second operation member 181 is detachably connected to the first housing 126. The second operation member 181 is used to cause the clutch member 192 to be moved to the engaging position.

The second operation member 181 is structured as a security key which is formed with a special shape, and the security key is capable of coupling to the first handle housing 126 detachably.

The first handle housing 126 forms a key groove 126a for receive the second operation member 181 and a key hole 126b for being passed through by the second operation member 181. When a user wants to use the lawncare apparatus 100, the user should put the second operation member 181 into the key groove 126a and push the second operation member 181 to a preset position such that the clutch member 192 is caused to move to the engaging position.

So if someone does not have the second operation member 181 or does not operate the second operation member 181 to a preset state, the user cannot operate the first operation member 180 to cause the transmission member 193 to rotate. This will prevent someone who has no ability to use the lawncare apparatus 100, such as children, from operating the lawncare apparatus 100 accidentally.

The second operation member 181 may also be structured as a button which is movably connected to the handle 120.

As above, the clutch member 192 is capable of performing a function as a clutch such that the mechanical transmission between the first operation member 180 and the switching device 160 is cut off when the second operation member 181 is not operated to a preset state by the user.

The flexible member 194 is structured as a flexible wire which has two opposite ends, one end is fixedly connected to the transmission member 193, another end is used to connect a trigger member 196 which is capable of causing the switching device 160 to turn on the motor 140.

Specifically, the switching device 160 is disposed in the main body 110, the flexible member 194 extends from the first handle housing 126 to the main body 110; and a portion of the flexible member 194 passes through the second handle housing 127.

Certainly, the switching device 160 may also be disposed in the second handle housing 127.

The trigger member 196 is structured as a frame which is capable of sliding relative to the main body 110, the switching device 160 includes a main box 162 which is configured to receive the circuit of the switching device 160 and a switching button 163 which is slidable relative to the main box 162. The trigger member 196 is capable of pressing the switching button 163 to a preset state such that the switching device 160 turns on the motor 140 when the trigger member 196 is pulled by the flexible member 194. When the trigger member 196 is not pulled by the flexible member 194, the switching button 163 will reset to a state such that the switching device 160 turns off the motor 140.

The transmission assembly 190 further includes a spring 197 which is configured to connect the flexible member 194 and the trigger member 196.

When the flexible member 194 is kept under a tension state, the flexible member 194 is capable of transmitting a tensile force between the transmission member 193 and switching device 160, but when the flexible member 194 is in a relaxation state, the flexible member 194 is not capable of transmitting a tensile force between the transmission member 193 and the switching device 160.

Specifically, the transmission assembly 190 further includes a tube 198 which is disposed on the flexible member 194.

The length of the flexible member 194 is set according to a safety distance between the user and the main body 100, so if the slide arm assembly 122 is moved towards the main body 100 to the predetermined position relative to the rotation arm assembly 121, the flexible member 194 will be curved to the relaxation state such that the mechanical transmission between the first operation member 180 and the switching device 160 is cut off no matter whether the second operation member 181 is operated in a right way. So even if the user forgets to pull out the second operation member 181, the flexible member 194 is capable of preventing the switching device 160 from being triggered to turn on the motor 140.

When the slide arm assembly 122 is moved away from the predetermined position relative to the rotation arm assembly 121 enough, the flexible member 194 is caused to be placed into the tension state to transmit a tensile force between the transmission member 193 and switching device 160.

The flexible member 194 is capable of performing a function as another clutch which is used to keep a safety distance between the main body 110 and the gripping portion 123 so as to ensure the safety of the user.

Figure 16:
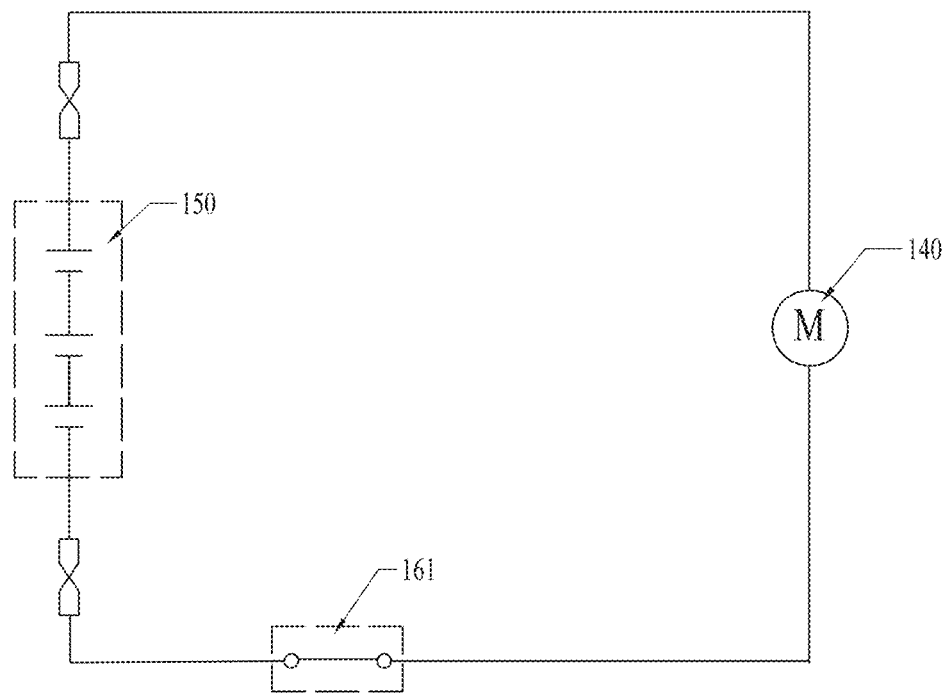
FIG. 16 shows an exemplary circuit of the lawncare apparatus in FIG. 6.
Figure 17:
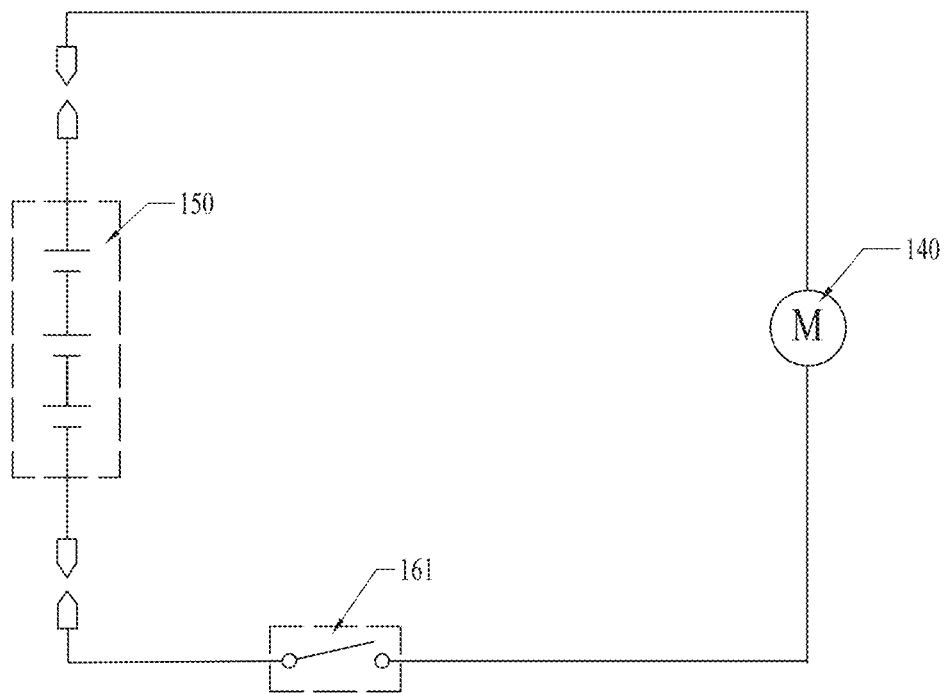
FIG. 17 shows the circuit in FIG. 16 when the switching device is in another state.

As shown as FIGS. 16-17, the switching device 160 may be a mechanical switch 161 connected between the motor 140 and the power supply 150 (such as a battery pack) of the motor 140. The mechanical switch 140 has a turn-on state that cause the mechanical switch to form a current channel between the motor 140 and the power supply 150 as shown in FIG. 16, and the mechanical switch 161 also has a turn-off state that cause the mechanical switch to cut off the current channel between the motor 140 and the power supply 150 as shown in FIG. 17. The mechanical switch 161 is capable of switching between the turn-on state and the turn-off state when the switch is operated in a physical way by a user directly or indirectly such that the mechanical switch can turn on or turn off the electrical connection between the motor 140 and the power supply 150. When the mechanical switch 161 switches to the turn-on state, a current can flow though the mechanical switch 161 to drive the motor 140; when the mechanical switch 161 switches to the turn-off state, the current channel between the motor 140 and the power supply is cut off so as to the motor 140 is turned off.

Figure 18:
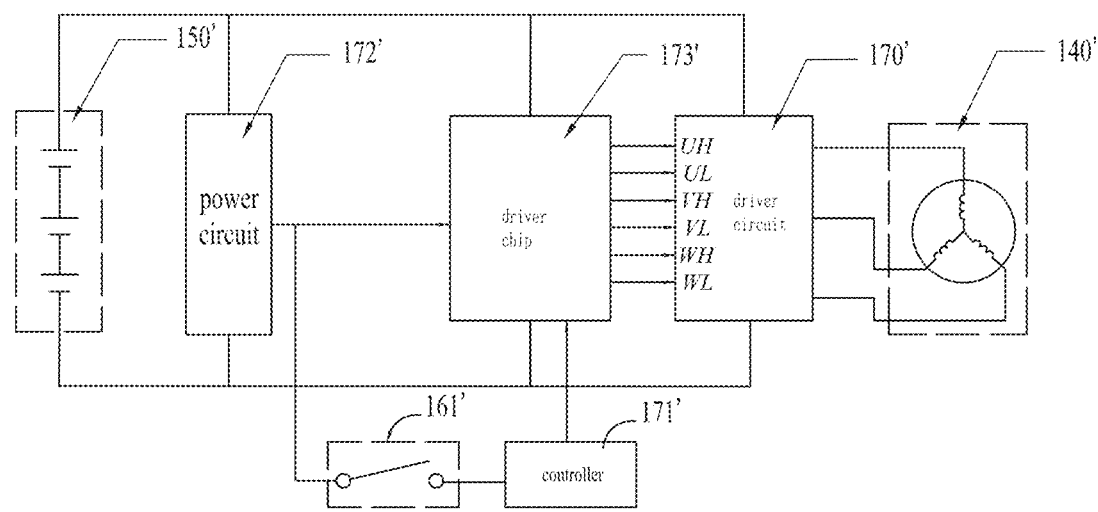
FIG. 18 shows another exemplary circuit of the lawncare apparatus in FIG. 6.
Figure 19:
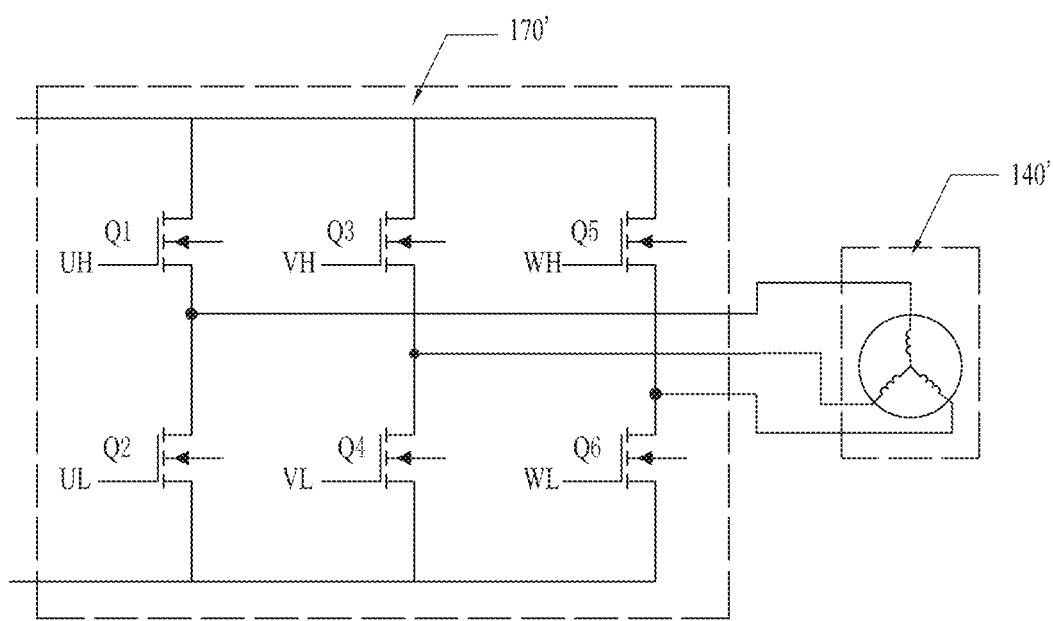
FIG. 19 shows an exemplary driver circuit of the circuit shown in FIG. 18

In an alternative embodiment, as shown as FIGS. 18-19, the switching device 160 is a signal source device 161'; the motor 140' is a brushless motor, the circuit of the lawncare apparatus 100 includes a drive circuit 170' and a controller 171', wherein the drive circuit 170' is electrically connected to the windings of the motor 140', and the signal source device 162' and the drive circuit 170' are both electrically connected to the controller 171'. The signal source device 162' has a first state that causes the signal source device to generate a control signal, and the signal source device also has a second state that causes the signal source device to not generate the control signal or generate a different signal. The signal source device is capable of switching between the first state and second state when the signal source device is operated in a physical way by a user directly or indirectly.

The control signal generated by the signal source device causes the controller 171' to send a drive signal to the drive circuit 170', the drive circuit 170' drives the motor 140' under control of the drive signal. The drive circuit 170' has a plurality of switching semi-conductors. The drive signal is capable of controlling the plurality of semiconductor switches.

FIG. 19 shows a drive circuit 170' for controlling the motor 140'. The drive circuit 170' includes switching semi-conductors Q1-Q6 having their control inputs coupled to outputs of the controller 171'. The controller 171' send the drive signal to turn on or off the switching semi-conductors Q1-Q6 in turn for controlling the start/stop and the speed of the motor 140'. The six switching semi-conductors Q1-Q6 perform the switching operation in according with drive signals UH to WL inputted from the controller 171' to thereby convert the voltage applied from power supply 150' to the drive circuit 170' and apply the voltage to the stator windings of the motor 140'.

The circuit of the lawncare apparatus 100 may further include a power circuit 172' and a driver chip 173'. The power circuit 172' is electrically connected with the power supply 150' to supply adaptive power to the driver chip 173'. The controller 171' and driver chip 173' can be replaced by a MCU chip.

Figure 20:
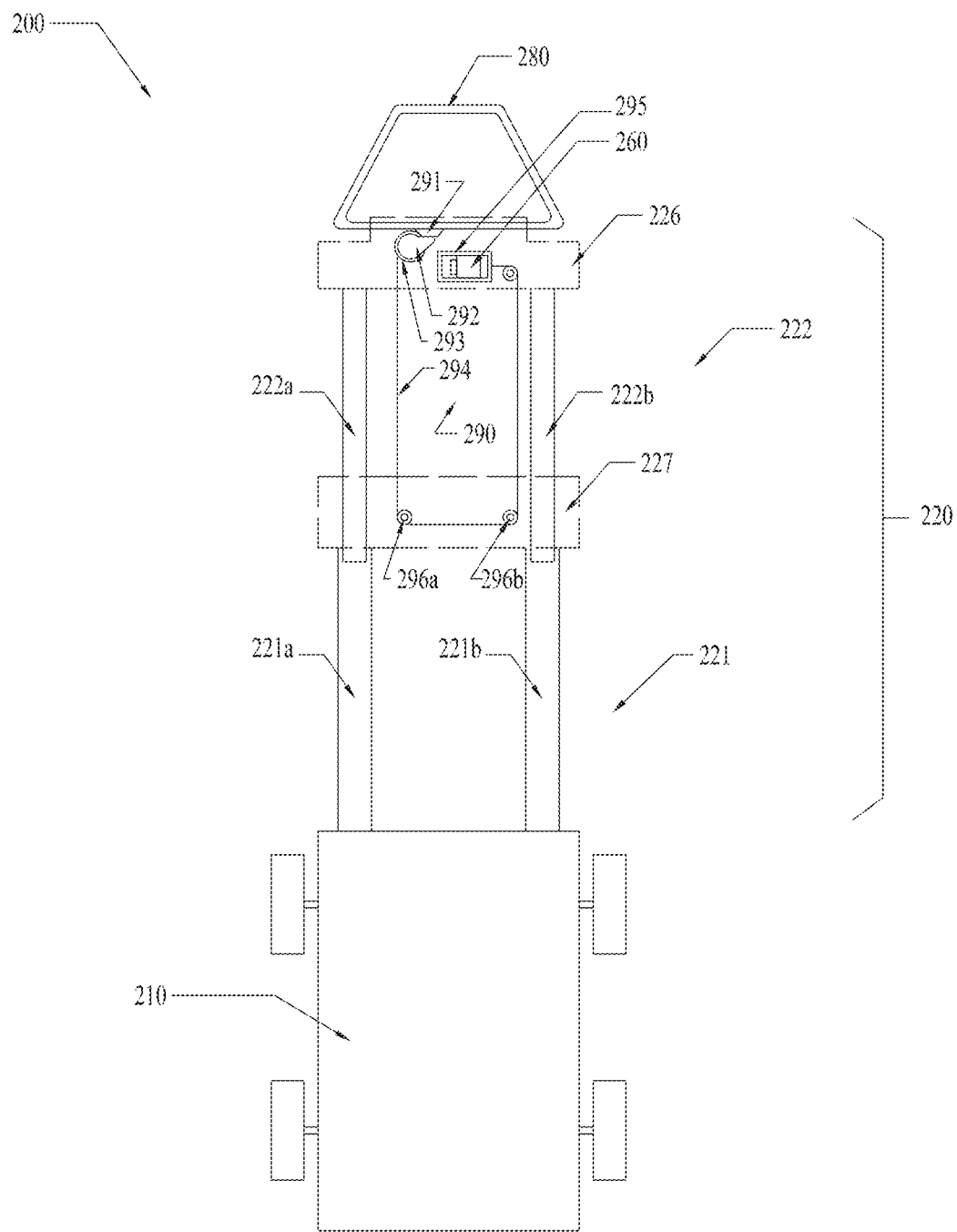
FIG. 20 is a simplified schematic diagram which shows another exemplary lawn mower.

FIG. 20 is a simplified schematic which shows another lawncare apparatus 200.

As shown in FIG. 20, the lawncare apparatus 200 also includes a main body 210, a handle 220 and an operation member 280, the main body 210 and handle 220 may have the same structure as the corresponding portions of the lawncare apparatus 100.

The handle 220 includes a first handle housing 226 which is fixedly connected to the slide arm assembly 222 and a second handle housing 227 which is connected to the rotation arm assembly 221.

The slide arm assembly 222 includes two slide arms 222a, 222b which are parallel to each other. The rotation arm assembly 221 includes two rotation arms 221a, 221b which are parallel to each other. The rotation arm 221a is structured as a tube which is capable of receiving the slide arm 222a slidably; the rotation arm 221b is also structured to be a tube which is capable of receiving the slide arm 222b slidably.

The first handle housing 226 is fixedly connected to slide arms 222a, 222b, and the gripping portion 223 is fixedly connected to the first handle housing 226.

The lawncare apparatus 200 further includes a switching device 260 which is disposed in the first handle housing 226 and a transmission assembly 290.

The transmission assembly 290 includes a trigger block 291, a clutch member 292, a transmission member 293, a flexible member 294 and trigger member 295 which have the same function as the trigger block 191, the clutch member 192, the transmission member 193, the flexible member 194 and trigger member 295.

For adapting to the position of the switching device 260, the transmission assembly 290 further includes two direction wheels 296a, 296b for directing the flexible member 194 in the second handle housing 227. So even if the two ends of the flexible member 194 are disposed in the first handle housing 227. The flexible member 194 is still capable of cutting off the transmission between the transmission member 293 and the trigger member 295 when the rotation arm assembly 221 is moved towards the main body 210 to a predetermined rotation position relative to the main body 210.

Figure 21:
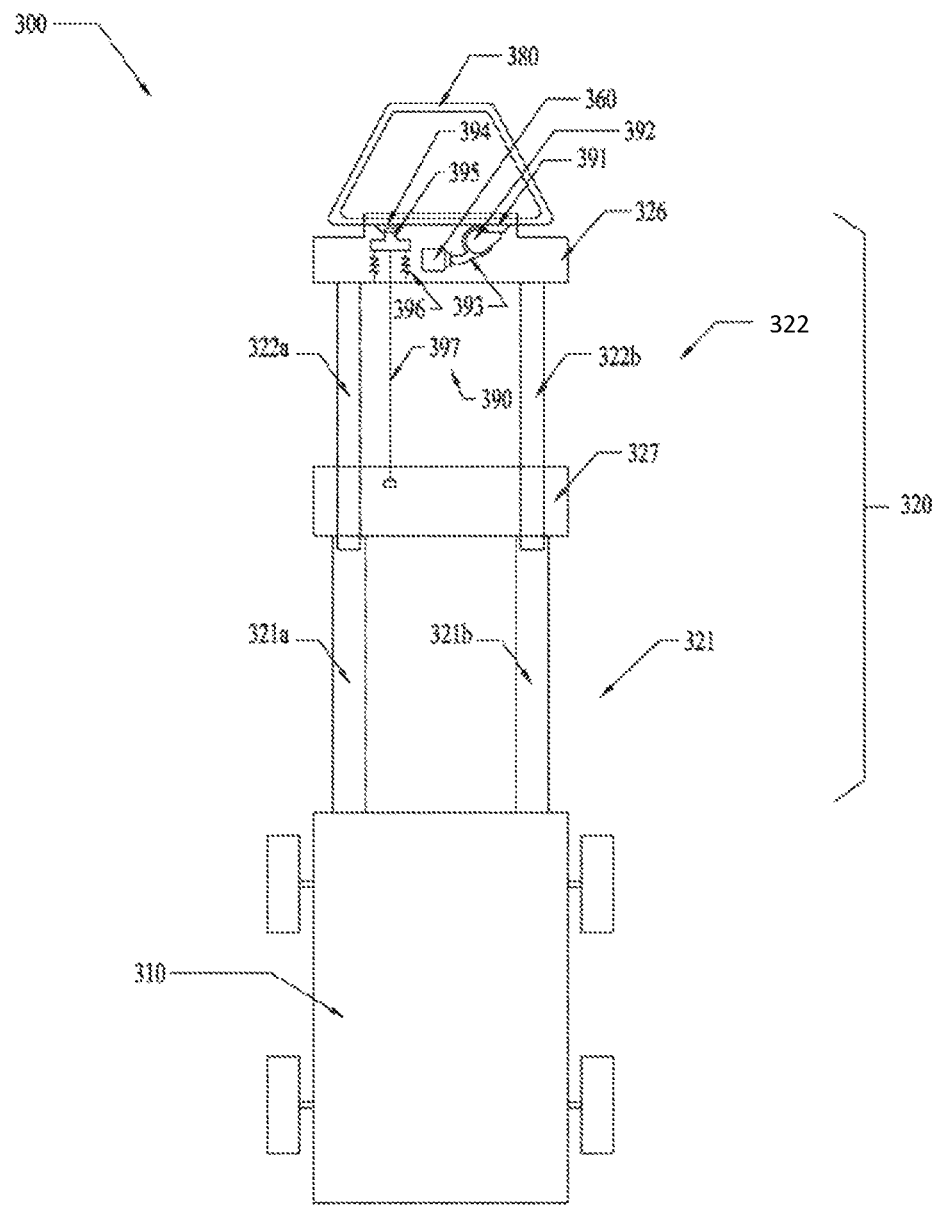
FIG. 21 is a simplified schematic diagram which shows another exemplary lawn mower.

FIG. 21 is a simplified schematic which shows another lawncare apparatus 300.

As shown in FIG. 21, the lawncare apparatus 300 also includes a main body 310, a handle 320 and a operation member 380, the main body 310 and handle 320 may have the same structure as the corresponding portions of the lawncare apparatus 300.

The handle 320 includes a first handle housing 326 which is fixedly connected to the slide arm assembly 322 and a second handle housing 327 which is connected to the rotation arm assembly 321.

The slide arm assembly 322 includes two slide arms 322a, 322b which are parallel to each other. The rotation arm assembly 321 includes two rotation arms 321a, 321b which are parallel to each other. The rotation arm 321a is structured as a tube which is capable of receiving the slide arm 322a slidably. The rotation arm 321b may also be a tube which is capable of receiving the slide arm 322b slidably.

The first handle housing 326 is fixedly connected to slide arms 322a, 322b, and the gripping portion 323 is fixedly connected to the first handle housing 326.

The lawncare apparatus 300 further includes a switching device 360 which is disposed in the first handle housing 326 and a safety assembly 390.

The safety assembly 390 includes a trigger block 391, a clutch member 392, a transmission member 393, a limiting block 394, a limiting member 395, a biasing member 396 and a pulling wire 397.

The trigger block 391, the clutch member 392, and the transmission member 393 have the same function as the trigger block 191, the clutch member 192, and the transmission member 193. The transmission member 393 forms a contacting portion for triggering the switching device 360 directly.

The limiting block 394 is fixedly connected to the operation member 380, the limiting member 395 is slidably connected to the first handle housing 326, and the biasing member 396 is configured to bias the limiting member 395 to the limiting block 394 such that the limiting member 395 can limit the rotation position of the operation member 380 so as to prevent the operation member 380 from moving to a predetermined position which cause the switching device 360 to turn on the motor of the lawncare apparatus 300.

The pulling wire 397 has two opposite ends, one end is connect to the limiting member 395; another end is connect to the second handle housing 327. When the slide arm assembly 322 moves away from the main body 310 enough, the pulling wire 397 will pull the limiting member 395 to move away from the limiting block 394 such that the operation member 380 can move to the position to turn on the motor of the lawncare apparatus 300. When the slide arm assembly 322 is moved towards the main body 310 relative to the rotation arm assembly 321, the pulling wire is placed in a relaxation state such that the limiting member 395 is biased to the limiting block 394 to keep the switching device 360 turning off the motor of the lawncare apparatus 300.

Figure 22:
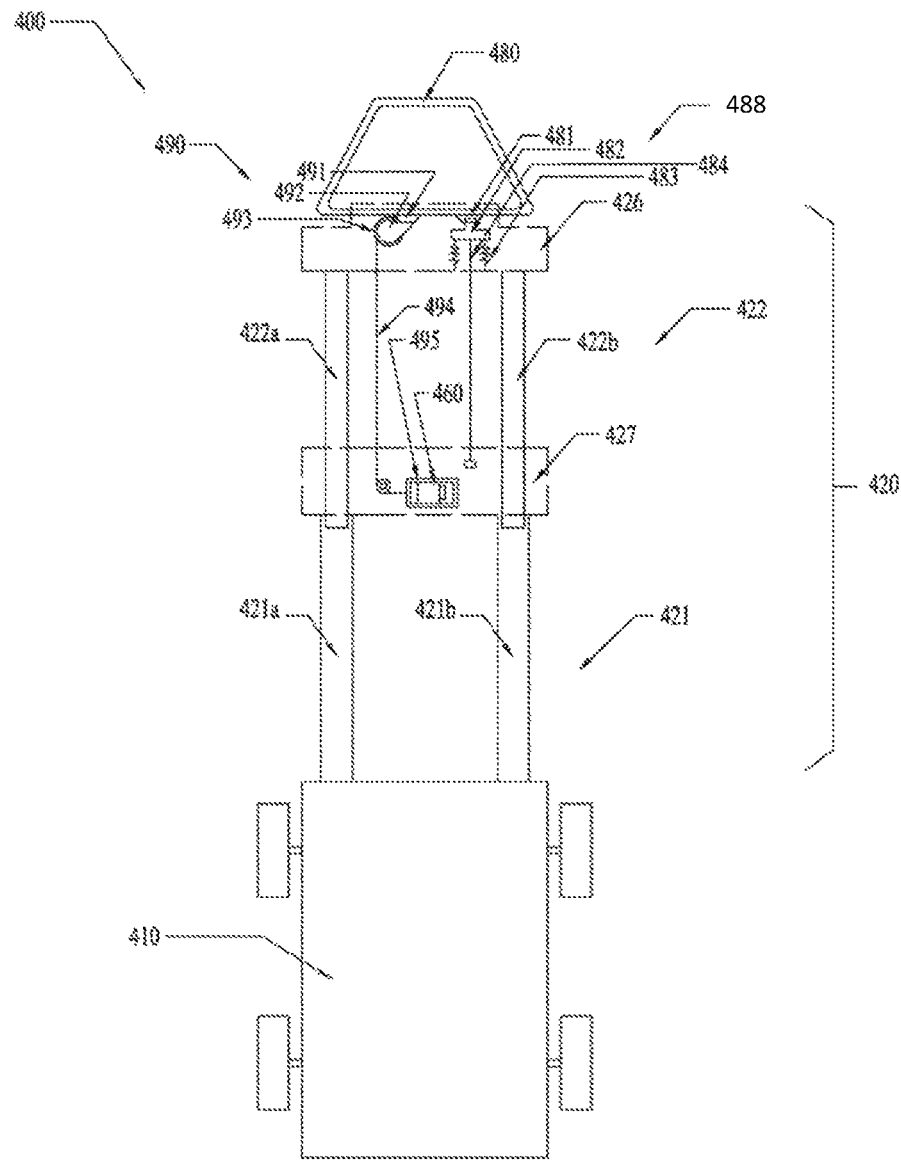
FIG. 22 is a simplified schematic diagram which shows another exemplary lawn mower.

FIG. 22 is a simplified schematic which shows another lawncare apparatus 400.

As shown in FIG. 22, the lawncare apparatus 400 also includes a main body 410, a handle 420 and an operation member 480, the main body 410 and handle 420 may have the same function as the corresponding portions of the lawncare apparatus 100.

The handle 420 includes a first handle housing 426 which is fixedly connected to the slide arm assembly 422 and a second handle housing 427 which is connected to the rotation arm assembly 421.

The slide arm assembly 422 includes two slide arms 422a, 422b which are parallel to each other. The rotation arm assembly 421 includes two rotation arms 421a, 421b which are parallel to each other. The rotation arm 421a is structured as a tube which is capable of receiving the slide arm 422a slidably; the rotation arm 421b is also structured to be a tube which is capable of receiving the slide arm 422b slidably.

The first handle housing 426 is fixedly connected to slide arms 422a, 422b, and the gripping portion 423 is fixedly connected to the first handle 426.

The lawncare apparatus 400 further includes a switching device 460 which is fixedly disposed in the second handle housing 427, certainly, the switching device 460 may also be disposed in the main body 410, a safety assembly 488 and a transmission assembly 490.

The safety assembly 488 includes a limiting block 481, a limiting member 482, a biasing member 483 and a pulling wire 484. The safety assembly 488 has the same function as the safety assembly 390 of the lawncare apparatus 300.

The transmission assembly 490 includes a trigger block 291, a clutch member 292, a transmission member 293, a flexible member 294 and trigger member 295. The transmission assembly 490 has the same function as the transmission assembly 190 of the lawncare apparatus 100.

So, as stated above, the safety assembly 488 and transmission assembly 490 all can keep the switching device 460 turning off the motor of the lawncare apparatus 400 when the slide arm assembly 422 is moved towards the main body 410 relative to the rotation arm assembly 421.

What is claimed is:

1. A lawn care apparatus, comprising:
   a main body;
   a motor supported by the main body;
   a plurality of wheels supporting the main body;
   a handle connected to the main body, the handle comprising a first member and a second member wherein the first member will move relative to the second member along a direction that is towards the main body;
   a switching device for controlling the motor;
   an operation member for being operated by a user, the operation member being movably connected to the handle; and
   a transmission assembly for performing a mechanical transmission between the operation member and the switching device such that the transmission assembly triggers the switching device to start the motor when the first member is moved to a predetermined position relative to the second member along a direction that is away from the main body,
   wherein the transmission assembly prevents the switching device in a mechanical way from controlling the motor to start when the first member is moved away from the predetermined position,
   wherein the first member is a slide arm assembly, the slide arm assembly comprises two slide arms extending at least partially along a first straight line, the second member is an arm assembly, the arm assembly comprises two arms extending at least partially along the first straight line, and the first member can slide to a predetermined position relative to the second member along the first straight line,
   wherein the transmission assembly comprises a flexible member having a first end and a second end, which are oppositely disposed,
   wherein the first end of the flexible member is connected to the switching device, the second end of the flexible member moves along with the two slide arms when the two slide arms slides relative to the arms along the first straight line, and
   wherein when the two slide arms slide to a predetermined position relative to the arms, the size of the handle increases in a direction of the first straight line, and the first end of the flexible member moves along with the two slide arms to tension the flexible member such that the transmission assembly triggers the switching device to start the motor; when the two slide arms are away from the predetermined position relative to the arms, the size of the handle in the direction of the first straight line is reduced, and the first end of the flexible member moves along with the two slide arms to loosen the flexible member such that the transmission assembly cannot trigger the switching device to start the motor.

2. The lawn care apparatus as recited in claim 1, wherein the switching device is disposed in the main body.

3. The lawn care apparatus as recited in claim 1, wherein the handle further comprises a first handle housing fixedly connected to the first member and the switching device is disposed in the first handle housing.

4. The lawn care apparatus as recited in claim 1, wherein the handle further comprises a second handle housing fixedly connected to the second member and the switching device is disposed in the second handle housing.

5. The lawn care apparatus as recited in claim 4, wherein the second member is rotatably connected to the main body.

6. The lawn care apparatus as recited in claim 1, wherein the handle further comprises a first handle housing fixedly connected to the first member and the switching device is disposed in the first handle housing, the operation member being rotatably connected to the first handle housing.

7. The lawn care apparatus as recited in claim 1, further comprising a security member for being operated by the user before using the operation member, the security member being at least one of movably or detachably connected to the handle, and wherein the transmission assembly comprises a first clutch member for cutting off the mechanical transmission between the operation member and the switching device when the security member is not operated to a preset state by the user and a second clutch member for cutting off the mechanical transmission between the operation member and the switching device when the first member is moved towards the main body to the predetermined position relative to the second member.

8. The lawn care apparatus as recited in claim 1, further comprising a security member for being operated by the user before using the operation member, the security member being at least one of movably or detachably connected to the handle, and wherein the transmission assembly comprises a clutch member for cutting off the mechanical transmission between the operation member and the switching device when the security member is not operated to a preset state by the user.

9. The lawn care apparatus as recited in claim 1, wherein the flexible member is configured to be in a tension state for transmitting a tensile force between the operation member and the switching device when the first member is moved from a predetermined position relative to the second member in a direction that is away from the main body and to be in a relaxation state such that the flexible member is not capable of performing the mechanical transmission between the operation member and the switching device.

* * * * *